US006403019B1

(12) United States Patent
Fukuda et al.

(10) Patent No.: US 6,403,019 B1
(45) Date of Patent: Jun. 11, 2002

(54) PROCESS FOR PREPARING SINTERED BODY OF ALUMINUM TITANATE

(76) Inventors: Tsutomu Fukuda, 785-1, Kunikane, Kamiso-cho, Kakogawa-shi, Hyogo-ken; Masahiro Fukuda, Asahi Plaza Mukaijimaminami 105, 52, Mekawa, Makishima-cho, Uji-shi, Kyoto-fu; Masaaki Fukuda, 785-1, Kunikane, Kamiso-cho, Kakogawa-shi, Hyogo-ken, all of (JP)

( * ) Notice: Subject to any disclaimer, the term of this patent is extended or adjusted under 35 U.S.C. 154(b) by 51 days.

(21) Appl. No.: 09/705,753

(22) Filed: Nov. 6, 2000

(30) Foreign Application Priority Data

Nov. 8, 1999 (JP) ............................................ 11-317136

(51) Int. Cl.$^7$ ............................................ C04B 35/478
(52) U.S. Cl. .......................... 264/658; 241/15; 241/16; 264/661; 264/681; 423/598; 501/127
(58) Field of Search ........................ 501/127; 423/598; 241/15, 16; 264/658, 661, 681

(56) References Cited

U.S. PATENT DOCUMENTS

| 4,307,198 A | | 12/1981 | Oda et al. .................... 501/119 |
| 5,055,435 A | * | 10/1991 | Hamanaka et al. .......... 501/127 |
| 5,137,789 A | | 8/1992 | Kaushal ....................... 428/472 |
| 5,260,116 A | | 11/1993 | Hamanaka et al. .......... 428/172 |
| 5,316,752 A | * | 5/1994 | Beggs et al. ................. 423/593 |
| 6,197,248 B1 | * | 3/2001 | Fukuda et al. ............... 264/658 |

OTHER PUBLICATIONS

European Search Report dated Apr. 11, 2001.
Long–term Thermal Stability and Mechanical Properties of Aluminum Titanate at 1000–1200° C; T.S. Liu, D.S. Perera; *Australian Nuclear Science and Technology Organisation*; (vol. 33, 1998) pp. 995–1001.
"Preparation of an Aluminum Titanate–25 vol% Mullite Composite by Sintering of Gel–Coated Powders"; Y.X. Huang, et al; *Journal of the European Ceramic Society*; (vol. 17, No. 10, 1997–1998); pp. 1239–1246.

* cited by examiner

*Primary Examiner*—James Derrington
(74) *Attorney, Agent, or Firm*—Armstrong, Westerman, Hattori, McLeland & Naughton LLP

(57) ABSTRACT

The present invention provides a process for preparing a raw material powder for producing a sintered body of aluminum titanate comprising:

pulverizing a mixture containing:
(1) 100 parts by weight of aluminum titanate crystals pulverized until a maximum grain size of 30 to 50 μm is attained; and
(2) 2 to 6 parts by weight of spinel crystals obtained by heating a mixture containing MgO and $Al_2O_3$ at 1250° C. to 1290° a molar ratio of MgO to $Al_2O_3$ being 1:0.95 to 1:1.05, said pulverizing being conducted by wet grinding process with a ball mill or cylinder mill.

5 Claims, No Drawings

PROCESS FOR PREPARING SINTERED BODY OF ALUMINUM TITANATE

TECHNICAL FIELD

The present invention relates to a process for preparing a raw material powder for producing a sintered body of aluminum titanate and to a process for preparing a sintered body of aluminum titanate.

BACKGROUND ART

Sintered bodies of aluminum titanate are known as heat-resistant materials because of their low coefficient of thermal expansion and high corrosion resistance. Such sintered bodies exhibit low wettability with slag, corrosion resistance, spalling resistance and other excellent properties when used as materials of containers, ladles, gutters, etc., for molten metals of aluminum, aluminum alloys, pig irons or the like. However, the sintered bodies of aluminum titanate, whose crystal grains constituting the sintered bodies are anisotropic, tend to suffer the following disadvantages: interfacial displacement between their crystal grains caused by stress due to thermal expansion; and formation of tiny cracks and apertures which may lead to lowered mechanical strength.

Hence, conventional sintered bodies of aluminum titanate can not exert sufficient durability when high temperature and heavy loads are applied thereto.

DISCLOSURE OF INVENTION

A primary purpose of the present invention is to provide a sintered body of aluminum titanate having improved mechanical strength and stability at high temperatures as well as their inherent properties, i.e., low coefficient of thermal expansion, high corrosion resistance and the like.

In view of the foregoing problems of the prior art, the present inventors carried out extensive research. Consequently, the inventors found that a mixture containing a finely pulverized spinel powder dispersed in an aluminum titanate powder is obtained by mixing spinel crystals which have been synthesized by heating a mixture of MgO and $Al_2O_3$ at 1250° to 1290° C. with aluminum titanate crystals which have been pulverized until a maximum grain size of 30 μm to 50 μm, and then pulverizing the mixture of the spinel crystals and the aluminum titanate crystals by wet grinding process using a ball mill or cylinder mill. The inventors also found the following: by forming the obtained mixture of the spinel crystals and the aluminum titanate crystals into a desired shape and then sintering the formed product, a fine spinel powder is charged into the intergranular spaces of a sintered body of aluminum titanate, and a eutectic reaction of aluminum titanate with spinel occurs during sintering. Hence, a sintered body of aluminum titanate having high strength can be obtained, and the strength of the sintered body hardly decreases even when used at high temperatures because said sintered body has resistance to the formation and growth of tiny cracks.

The present invention provides a process for preparing a raw material powder for producing a sintered body of aluminum titanate, and a process for preparing a sintered body of aluminum titanate as mentioned below.

1. A process for preparing a raw material powder for producing a sintered body of aluminum titanate comprising:
    pulverizing a mixture containing:
    (1) 100 parts by weight of aluminum titanate crystals pulverized until a maximum grain size of 30 to 50 μm is attained; and
    (2) 2 to 6 parts by weight of spinel crystals obtained by heating a mixture containing MgO and $Al_2O_3$ at 1250° C. to 1290°, a molar ratio of MgO to $Al_2O_3$ being 1:0.95 to 1:1.05,
said pulverizing being conducted by wet grinding process with a ball mill or cylinder mill.

2. The process for preparing the raw material powder according to item 1, wherein the mixture containing aluminum titanate crystals and spinel crystals is pulverized until the maximum grain size of aluminum titanate crystals becomes 3 μm or smaller.

3. The process for preparing the raw material powder according to item 1, wherein the aluminum titanate crystals are prepared by heating a mixture of titanium oxide in anatase form with γ-alumina and the spinel crystals are prepared by heating γ-alumina and soft-burned magnesia.

4. A process for preparing a sintered body of aluminum titanate, the process comprising the steps of forming the raw material powder obtained by the process according to item 1 into a desired shape; and sintering the formed product.

5. The process for preparing the sintered body of aluminum titanate according to item 4, wherein sintering is conducted at 1600° C. to 1700° C. and then cooling to 1200° C. is conducted at a cooling rate of 280° C./hour or higher.

The process for preparing a raw material powder for producing the sintered body of aluminum titanate of the present invention employs aluminum titanate crystals and spinel crystals as a starting material.

The aluminum titanate crystals are not particularly limited insofar as they are obtained by heating $Al_2O_3$ and $TiO_2$. Usable $Al_2O_3$ and $TiO_2$ are any of those which are capable of forming aluminum titanate when heated. Usually, they are suitably selected from the materials for producing alumina ceramics, titania ceramics, aluminum titanate ceramics and like ceramics. Particularly, it is preferable to use γ-$Al_2O_3$ as $Al_2O_3$ and titanium oxide in anatase form as $TiO_2$ since the reaction which forms aluminum titanate progresses readily and quickly in a high yield by heating. The γ-$Al_2O_3$ preferably has an average grain size of about 0.2 μm to about 1 μm and the titanium oxide in anatase form preferably has an average grain size of about 0.4 μm to about 1 μm. In this specification, a grain size is the value determined by light scattering method.

$Al_2O_3$ and $TiO_2$ are used at a molar ratio of $Al_2O_3$:$TiO_2$ of about 1:0.95 to about 1:1.05, preferably in an equimolar amount.

The aluminum titanate crystals can be synthesized by uniformly mixing $Al_2O_3$ and $TiO_2$ and then heating the mixture at about 1500° C. to about 1600° C. The heating can be usually carried out in an oxidizing atmosphere, for example, in air. The heating time is not critical and may be a length of time required to sufficiently form aluminum titanate crystals, usually about 2 hours or longer.

The spinel crystals for use in the invention are prepared by heating a mixture containing MgO and $Al_2O_3$ at a molar ratio of MgO : $Al_2O_3$ of about 1:0.95 to about 1:1.05, preferably about 1:1 at a temperature of about 1250° C. to about 1290° C. Thus-obtained spinel crystals can be readily pulverized and are so stable that they do not dissociate in water during wet grinding process described below. Heating the crystals at a temperature above the aforementioned range is not favorable since the resulting spinel crystals become difficult to be pulverized. The heating may be carried out in an oxidizing atmosphere, e.g., air, for about 1 to about 5 hours, preferably about 2 to about 4 hours. The starting materials for preparing the spinel may be those which are capable of forming spinel on heating and are suitably selected from conventional materials for producing spinel. For instance, $\gamma$-$Al_2O_3$ and soft-burned magnesia are useful as $Al_2O_3$ and MgO, respectively. The $\gamma$-$Al_2O_3$ preferably has an average grain size of about 0.2 $\mu$m to about 1 $\mu$m, and the soft-burned magnesia preferably has an average grain size of about 1 $\mu$m to about 3.5 $\mu$m.

As mentioned in the above, it is necessary for the present invention to use aluminium titanate crystals and spinel crystals which have been separately synthesized. When all raw materials for synthesizing aluminium titanate crystals and spinel crystals are mixed and heated together, intermediate products are formed in addition to aluminium titanate and spinel. When the raw material containing such intermediate products is used for producing a sintered body of aluminium titanate, the intermediate products become unstable elements in the sintered body. These elements prevent the formation of the highly strengthened sintered body of the invention.

It is essential for the present invention that aluminum titanate crystals which have been pulverized until a maximum grain size of about 30 $\mu$m to about 50 $\mu$m is attained are admixed with spinel crystals, and then the aluminum titanate crystals and the spinel crystals are pulverized together.

The method for pulverizing aluminium titanate until a maximum grain size of about 30–50 $\mu$m is attained is not limited, and may be carried out using ball mill, cylinder mill, etc.

The spinel crystals are those synthesized in the above mentioned conditions. The lumps of the spinel crystals obtained by heating can be used as they are, or the lumps of the spinel crystals may be pulverized to an appropriate size before being mixed with aluminum titanate crystals.

The weight ratio of spinel crystals:aluminum titanate crystals is preferably about 2:100 to about 6:100, more preferably about 4:100 to 6:100.

The aluminum titanate crystals and spine crystals can be pulverized together by wet grinding process using a ball mill or cylinder mill. The degree of the pulverization is not critical. Preferably, the mixture is pulverized until the maximum grain size of the aluminum titanate becomes about 3 $\mu$m or smaller. More preferably, the mixture is pulverized until the maximum grain size of the aluminum titanate crystals becomes about 1 $\mu$m to about 3 $\mu$m.

Spinel is more easily pulverized than aluminum titanate. Thus, when the aluminum titanate crystals and the spinel crystals are pulverized together using a ball mill or cylinder mill, a finely pulverized spinel powder mingles with the aluminum titanate powder. Due to the ability of the ball mill or cylinder mill to pulverize by sliding and by impact, a finely pulverized spinel powder having appropriately wide distribution of grain size can be formed. Therefore, the spinel can be efficiently charged into the intergranular spaces of the aluminum titanate particles of the sintered body. For example, when the aluminum titanate crystals having a maximum grain size of about 30 $\mu$m to about 50 $\mu$m are pulverized using a ball mill or cylinder mill until their maximum grain size becomes about 2 $\mu$m or smaller, the spinel having a maximum grain size of about 0.1 $\mu$m or smaller and appropriate grain size distribution is usually obtained. Accordingly, the resulting mixed powder of aluminum titanate and spinel is excellent in sinterability and an ability to be charged into intergranular space of aluminum titanate.

By forming such mixed powder into a desired shape and sintering the formed product, the spinel is charged into the intergranular spaces of aluminum titanate, reducing the intergranular spaces. A eutectic reaction occurs between the spinel and aluminum titanate during sintering, whereby the progress of tiny cracks, even when formed, can be suppressed. In addition, the spinel does not induce the formation of cracks even at high temperatures because its coefficient of thermal expansion is similar to that of the aluminum titanate.

When using a ball mill or cylinder mill for pulverization, water is added to the mixture of spinel crystals and aluminum titanate crystals to impart appropriate viscosity to the mixture. Usually, about 30 to about 40 parts by weight of water may be added based on 100 parts by weight of the total amount of the aluminum titanate crystals and the spinel crystals. Optionally, a dispersant such as sodium polymethacrylate and sodium polyacrylate may be added to the mixture in an amount of about 0.5 part to about 1 part by weight based on 100 parts by weight of the mixture during the pulverization. Further, various forming aids for use in preparing the sintered body of aluminum titanate may be added to the mixture during the pulverization.

In the above-described manner, a raw material powder for preparing the sintered body of aluminum titanate can be obtained as a slurry. The raw material powder for preparing the sintered body of aluminum titanate can also be produced as a dried powder by drying the obtained slurry.

The raw material powder prepared by pulverizing the mixture of aluminum titanate crystals and spinel crystals in the aforementioned manner is formed into a desired shape and sintered, giving a sintered body of aluminum titanate. The resultant sintered body of aluminum titanate is resistant to a decrease in strength even when used in a high-temperature atmosphere.

The sintered body of aluminum titanate of the invention can be prepared by the procedure comprising the following steps: adding a forming aid to the foregoing raw material powder, if necessary; forming the raw material powder into a desired shape; and sintering the formed product.

The forming aid for use herein may be selected from those which have been conventionally used depending on the forming method.

Such useful forming aids include polyvinyl alcohol, microwax emulsion, carboxymethylcellulose and like binders; stearic acid emulsion and like mold releasing agents; and n-octyl alcohol, octylphenoxy ethanol and like antifoaming agents.

The amount of these forming aids is not critical, and may be suitably selected within the range of the amount of conventional forming aids depending on the forming method. For example, in slip casting, the binder may be used in an amount of about 0.4 part to about 0.6 part by weight; the mold releasing agent may be used in an amount of about 0.2 to about 0.7 part by weight (solid weight); and the antifoaming agent may be used in an amount of about 0.03 to about 0.1 part by weight, all based on 100 parts by weight of a mixture of aluminum titanate and spinel.

The forming method is not particularly restricted and may be suitably selected from conventional forming methods such as press molding, sheet casting, slip casting, extrusion molding, injection molding, CIP molding, etc.

Sintering is preferably carried out by the method comprising the steps of heating the formed product at about 1600–1700° C., more preferably about 1600–1650° C., and rapidly cooling the resulting sintered body to about 1200° C. The preferable cooling rate for rapidly cooling the sintered body to about 1200° C. is about 280° C./hour or higher, more preferably about 300° C./hour or higher. This rapid cooling at the above-specified rate inhibits the growth of the crystal particles, thereby giving highly strengthened sintered body.

The method for cooling the sintered body after being cooled to 1200° C. is not particularly limited. Usually, the sintered body is allowed to cool in air, whereas it may be rapidly cooled.

The atmosphere for sintering may be oxidizing atmospheres at ordinary pressure such as air, which are conventionally employed. Sintering may be conducted until the sintering reaction sufficiently progresses, and usually conducted at about 1600° C. to 1700° C. for about 3 to 4 hours.

The sintered body of aluminum titanate obtainable by the process of the invention not only has its inherent properties of low coefficient of thermal expansion and high corrosion resistance, but also has high mechanical strength. Further, the strength of the sintered body hardly decreases and remains high even when the sintered body is used at high temperatures. For instance, such sintered body of aluminum titanate is useful for tools in melting operations of aluminum, aluminum alloy, iron, ferroalloy and the like because of its low wettability with molten metals, high heat resistance, high corrosion resistance and high spalling resistance.

Because of these excellent properties, the sintered body obtainable by the process of the invention is useful for the following applications:
(1) articles for measuring the temperature of molten metal or glass in a blast furnace, an electric furnace, a non-ferrous metal furnace, a glass furnace or the like;
(2) protective pipe for the thermometer in a combustion gas in an incinerator or the like;
(3) tools such as a ladle and gutter for a melting furnace of non-ferrous alloy, ferroalloy, etc.
(4) heat-resistant tools and crucibles used for producing artificial teeth;
(5) interior wall tiles, refractories, etc. of melting furnace for iron or non-ferrous metals;
(6) articles for high-temperature portions of an automotive engine;
(7) fan blades, compressors, turbine burners and like aircraft engine components, heat-resistant tiles, heat-resistant components, exhaust components and the like for aircraft;
(8) material for plasma spraying device for iron, nonferrous metals, ceramics, etc.;
(9) heat-shielding material for the surface of spacecraft structural parts such as leading edge thermal shield, vertical tail, after fuselage and flap and external wall tiles of spacecraft;
(10) parts for die casting machines, pressure casting machines or the like such as sleeves, chips, metal molds, core pins, stokes, pots, goose necks, parts for electromagnetic pump, pipes and pouring parts;
(11) rollers, roller guides and generic guide members for rolling iron or non-ferrous metal;
(12) parts for casting non-ferrous metals such as insulators and frame molds
(13) shafts, blades or the like used in melting mixers for iron, non-ferrous metals or the like
(14) turbochargers, blades and like parts of internal combustion engines such as diesel engines and gas turbines.

EXAMPLES

The present invention is described below in more details with reference to the following examples.

Example 1

γ-Alumina powder (5.6 kg) having an average grain size of 0.4 μm and titanium oxide powder in anatase form (4.4 kg) having an average grain size of 0.6 μm were mixed. To this mixture was added 4000 cc of water and 3 g (solid weight) of acrylic oligomer as a deflocculant. The mixture was mixed and pulverized by a ball mill for 3 hours. The resulting slurry was air-dried at 120° C. The resulting powder was charged into a mullite sagger and heated in air with an electric furnace. The heating temperature was increased to 1600° C. at the heating rate of 50° C./hour, and then maintained at 1600° C. for 4 hours. The powder was allowed to cool, giving aluminum titanate crystals.

The obtained aluminum titanate crystals and 4000 cc of water were fed into a ball mill and pulverized for 4 hours until the maximum grain size of aluminum titanate became 50 μm. The pulverized crystals were dried at 120° C., giving a powder of aluminum titanate crystals. γ-Alumina powder (0.72 kg) having an average grain size of 0.4 μm and sea water magnesia (0.28 kg) having an average grain size of 3.5 μm were mixed. To this mixture was added 800 cc of water. The mixture was pulverized by an alumina ball mill for 4 hours, and air-dried at 120° C. The powder was then charged into an alumina sagger and heated in air by an electric furnace. The heating temperature was increased to 1250° C. at the heating rate of 100° C./hour, and then maintained at 1250° C. for 4 hours. The powder was allowed to cool, giving spinel crystal.

Six material powders were prepared by adding separately the amounts of 0 g, 20 g, 40 g, 60 g, 120 g and 160 g of the obtained spinel crystals to 1 kg of the powder of aluminum titanate crystals obtained in the above, thereby forming six material powders each having the 1 kg of aluminum titanate crystal powder as a base. To the respective material powders were added 300 cc of water, 4 g of carboxymethylcellulose as a binder, 10 g of sodium polymethacrylate as a dispersant, 5 g of stearic acid emulsion as a mold releasing agent and 0.7 g of n-octyl alcohol as an antifoaming agent. The mixtures were pulverized by a ball mill for 12 hours until the maximum grain size of aluminum titanate crystals became about 1 μm, giving slurries containing raw material powders for preparing the sintered body of aluminum titanate.

The obtained slurries containing the raw material powders for producing the sintered body of aluminum titanate were deaerated under reduced pressure and charged into plaster molds. The materials were drawn out from the molds after 15 minutes, giving cylindrical molded articles measuring 10 mm in diameter and 100 mm in length. The molded articles were allowed to dry for 8 hours and then air-dried at 60° C. for 12 hours. The molded articles were placed on the high-alumina hearth of an electric furnace and heated to 1600° C. at the heating rate of 100° C./hour and maintained at 1600° C. for 2 hours. Subsequently, the molded articles were cooled from 1600° C. to 1200° C. at the cooling rate of 300° C./hour and then allowed to cool, giving sintered articles.

The resulting sintered articles were tested for their sintering shrinkage rate, breaking strength and bending strength. The bending strength was determined with a sample support span of 36 mm. The test results are shown below in Table 1, wherein the resultant values are the average of the values of 10 test samples having the same composition.

TABLE 1

| Spinel content (g) | Sintering shrinkage rate (%) | Breaking strength (kg) | Sample diameter (cmφ) | Bending strength (kg/cm²) |
|---|---|---|---|---|
| 0 | 12.9 | 17.0 | 0.93 | 195 |
| 20 | 15.1 | 24.0 | 0.89 | 312 |
| 40 | 17.5 | 38.0 | 0.87 | 529 |
| 60 | 19.1 | 36.0 | 0.83 | 577 |
| 120 | 20.2 | 19.4 | 0.82 | 322 |
| 160 | 19.5 | 19.0 | 0.86 | 274 |

Thereafter, these sintered articles were further ground into small cylinders measuring 4 mm in diameter and 20 mm in length. The cylinders were tested for their thermal expansion rates at temperatures ranging from 150° C. to 950° C. The results are shown below in Table 2 to Table 7.

TABLE 2

Spinel content 0 g

| Temperature (° C.) | Thermal expansion rate ($\times 10^{-4}$) | Mean coefficient of linear expansion ($\times 10^{-6}$/K) |
|---|---|---|
| 150 | −1.76 | −3.53 |
| 200 | −3.09 | −3.09 |
| 250 | −4.16 | −2.77 |
| 300 | −5.00 | −2.50 |
| 350 | −5.78 | −2.31 |
| 400 | −6.37 | −2.12 |
| 450 | −6.56 | −1.87 |
| 500 | −6.55 | −1.64 |
| 550 | −6.36 | −1.41 |
| 600 | −5.80 | −1.16 |
| 650 | −5.13 | −0.93 |
| 700 | −4.37 | −0.73 |
| 750 | −3.44 | −0.53 |
| 800 | −2.33 | −0.33 |
| 850 | −1.12 | −0.15 |
| 900 | −0.09 | −0.01 |
| 950 | 0.67 | 0.08 |

TABLE 3

Spinel content 20 g

| Temperature (° C.) | Thermal expansion rate ($\times 10^{-3}$) | Mean coefficient of linear expansion ($\times 10^{-6}$/K) |
|---|---|---|
| 150 | −0.33 | −6.61 |
| 200 | −0.54 | −5.36 |
| 250 | −0.71 | −4.70 |
| 300 | −0.84 | −4.22 |
| 350 | −0.98 | −3.90 |
| 400 | −1.08 | −3.61 |
| 450 | −1.18 | −3.36 |
| 500 | −1.24 | −3.09 |
| 550 | −1.27 | −2.83 |
| 600 | −1.28 | −2.56 |
| 650 | −1.27 | −2.31 |
| 700 | −1.24 | −2.07 |
| 750 | −1.18 | −1.81 |
| 800 | −1.10 | −1.57 |
| 850 | −1.03 | −1.37 |
| 900 | −0.94 | −1.18 |
| 950 | −0.84 | −0.98 |

TABLE 4

Spinel content 40 g

| Temperature (° C.) | Thermal expansion rate ($\times 10^{-3}$) | Mean coefficient of linear expansion ($\times 10^{-6}$/K) |
|---|---|---|
| 150 | −0.24 | −4.90 |
| 200 | −0.43 | −4.32 |
| 250 | −0.59 | −3.96 |
| 300 | −0.74 | −3.72 |
| 350 | −0.87 | −3.48 |
| 400 | −0.98 | −3.27 |
| 450 | −1.07 | −3.05 |
| 500 | −1.15 | −2.88 |
| 550 | −1.20 | −2.67 |
| 600 | −1.23 | −2.45 |
| 650 | −1.23 | −2.23 |
| 700 | −1.20 | −2.00 |
| 750 | −1.13 | −1.74 |
| 800 | −1.04 | −1.49 |
| 850 | −0.97 | −1.29 |
| 900 | −0.88 | −1.10 |
| 950 | −0.77 | −0.91 |

TABLE 5

Spinel content 60 g

| Temperature (° C.) | Thermal expansion rate ($\times 10^{-3}$) | Mean coefficient of linear expansion ($\times 10^{-6}$/K) |
|---|---|---|
| 150 | −0.28 | −5.60 |
| 200 | −0.55 | −5.45 |
| 250 | −0.80 | −5.31 |
| 300 | −0.95 | −4.73 |
| 350 | −1.07 | −4.29 |
| 400 | −1.18 | −3.93 |
| 450 | −1.27 | −3.63 |
| 500 | −1.35 | −3.36 |
| 550 | −1.39 | −3.10 |
| 600 | −1.41 | −2.83 |
| 650 | −1.42 | −2.58 |
| 700 | −1.41 | −2.35 |
| 750 | −1.38 | −2.12 |
| 800 | −1.31 | −1.87 |
| 850 | −1.24 | −1.65 |
| 900 | −1.16 | −1.45 |
| 950 | −1.04 | −1.23 |

TABLE 6

Spinel content 120 g

| Temperature (° C.) | Thermal expansion rate ($\times 10^{-4}$) | Mean coefficient of linear expansion ($\times 10^{-6}$/K) |
|---|---|---|
| 150 | −2.22 | −4.44 |
| 200 | −3.84 | −3.84 |
| 250 | −5.24 | −3.49 |
| 300 | −6.46 | −3.23 |
| 350 | −7.55 | −3.02 |
| 400 | −8.42 | −2.81 |
| 450 | −9.15 | −2.61 |
| 500 | −9.69 | −2.42 |
| 550 | −9.90 | −2.20 |
| 600 | −9.69 | −1.94 |

TABLE 6-continued

Spinel content 120 g

| Temperature (° C.) | Thermal expansion rate ($\times 10^{-4}$) | Mean coefficient of linear expansion ($\times 10^{-6}$/K) |
| --- | --- | --- |
| 650 | −9.46 | −1.72 |
| 700 | −8.98 | −1.50 |
| 750 | −8.11 | −1.25 |
| 800 | −6.73 | −0.96 |
| 850 | −5.34 | −0.71 |
| 900 | −4.13 | −0.52 |
| 950 | −2.75 | −0.32 |

TABLE 7

Spinel content 160 g

| Temperature (° C.) | Thermal expansion rate ($\times 10^{-3}$) | Mean coefficient of linear expansion ($\times 10^{-6}$/K) |
| --- | --- | --- |
| 150 | −0.30 | −5.90 |
| 200 | −0.51 | −5.08 |
| 250 | −0.68 | −4.52 |
| 300 | −0.82 | −4.12 |
| 350 | −0.94 | −3.75 |
| 400 | −1.03 | −3.43 |
| 450 | −1.09 | −3.12 |
| 500 | −1.14 | −2.86 |
| 550 | −1.17 | −2.60 |
| 600 | −1.17 | −2.35 |
| 650 | −1.15 | −2.09 |
| 700 | −1.11 | −1.86 |
| 750 | −1.05 | −1.61 |
| 800 | −0.95 | −1.36 |
| 850 | −0.86 | −1.14 |
| 900 | −0.76 | −0.95 |
| 950 | −0.65 | −0.76 |

The above results reveal the following: the sintered body prepared from a mixed powder prepared by adding spinel crystals in a range of 20 g to 60 g to 1 kg of aluminum titanate crystals and pulverizing the mixture has high strength and low coefficient of thermal expansion. In particular, the sintered body prepared from a powder mixture containing the spinel crystals in a range of 40 g to 60 g has excellent properties.

What is claimed is:

1. A process for preparing a raw material powder for producing a sintered body of aluminum titanate comprising:

pulverizing a mixture containing:
   (1) 100 parts by weight of aluminum titanate crystals pulverized until a maximum grain size of 30 to 50 μm is attained; and
   (2) 2 to 6 parts by weight of spinel crystals obtained by heating a mixture containing MgO and $Al_2O_3$ at 1250° C. to 1290° C., a molar ratio of MgO to $Al_2O_3$ being 1:0.95 to 1:1.05, said pulverizing being conducted by wet grinding process with a ball mill or cylinder mill.

2. The process for preparing the raw material powder according to claim 1, wherein the mixture containing aluminum titanate crystals and spinel crystals is pulverized until the maximum grain size of aluminum titanate crystals becomes 3 μm or smaller.

3. The process for preparing the raw material powder according to claim 1, wherein the aluminum titanate crystals are prepared by heating a mixture of titanium oxide in anatase form with γ-alumina and the spinel crystals are prepared by heating γ-alumina and soft-burned magnesia.

4. A process for preparing a sintered body of aluminum titanate, the process comprising the steps of forming the raw material powder obtained by the process according to claim 1 into a desired shape; and sintering the formed product.

5. The process for preparing the sintered body of aluminum titanate according to claim 4, wherein sintering is conducted at 1600° C. to 1700° C. and then cooling to 1200° C. is conducted at a cooling rate of 280° C./hour or higher.

* * * * *